United States Patent
Atungsiri et al.

(10) Patent No.: US 11,943,163 B2
(45) Date of Patent: Mar. 26, 2024

(54) SYNCHRONISATION AND BROADCASTING BETWEEN BASE STATION AND USER EQUIPMENT

(71) Applicant: Sony Group Corporation, Tokyo (JP)

(72) Inventors: Samuel Asangbeng Atungsiri, Basingstoke (GB); Martin Warwick Beale, Basingstoke (GB); Shin Horng Wong, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/389,356

(22) Filed: Jul. 30, 2021

(65) Prior Publication Data
US 2021/0360553 A1 Nov. 18, 2021

Related U.S. Application Data

(63) Continuation of application No. 16/469,185, filed as application No. PCT/EP2017/083955 on Dec. 20, 2017, now Pat. No. 11,096,133.

(30) Foreign Application Priority Data

Dec. 22, 2016 (EP) .................................... 16206517

(51) Int. Cl.
*H04L 5/00* (2006.01)
*H04L 27/26* (2006.01)
(Continued)

(52) U.S. Cl.
CPC .......... *H04L 5/0053* (2013.01); *H04L 5/0083* (2013.01); *H04L 5/0094* (2013.01);
(Continued)

(58) Field of Classification Search
CPC ... H04L 5/0053; H04L 5/0083; H04L 5/0094; H04L 27/26025; H04L 27/2613;
(Continued)

(56) References Cited

U.S. PATENT DOCUMENTS

2008/0316957 A1* 12/2008 Shen ...................... H04J 13/00
370/328
2017/0302489 A1* 10/2017 Lindbom ............ H04L 27/2613
(Continued)

FOREIGN PATENT DOCUMENTS

GB 2551587 A 12/2017
GB 2551588 A 12/2017

OTHER PUBLICATIONS

International Search Report and Written Opinion dated Jul. 11, 2018 for PCT/EP2017/083955 filed on Dec. 20, 2017, 15 pages.
(Continued)

*Primary Examiner* — Jung H Park
(74) *Attorney, Agent, or Firm* — XSENSUS LLP

(57) ABSTRACT

A base station for a mobile telecommunications system has circuitry configured to communicate with at least one user equipment, wherein the circuitry is further configured to set a first subcarrier spacing for transmission of at least one synchronization signal; and set a second subcarrier spacing for transmission on a physical broadcast channel, wherein the first subcarrier spacing differs from the second subcarrier spacing.

15 Claims, 4 Drawing Sheets

(51) Int. Cl.
*H04W 4/06* (2009.01)
*H04W 56/00* (2009.01)

(52) U.S. Cl.
CPC .... *H04L 27/26025* (2021.01); *H04L 27/2613* (2013.01); *H04W 4/06* (2013.01); *H04W 56/001* (2013.01)

(58) Field of Classification Search
CPC . H04L 27/2692; H04L 27/34; H04L 27/3836; H04L 27/2662; H04L 5/0007; H04W 4/06; H04W 56/001; H04W 56/00
See application file for complete search history.

(56) References Cited

U.S. PATENT DOCUMENTS

| | | |
|---|---|---|
| 2018/0054800 A1 | 2/2018 | Yeo et al. |
| 2018/0091249 A1 | 3/2018 | Han et al. |
| 2018/0123849 A1* | 5/2018 | Si ................ H04L 27/2613 |
| 2018/0152905 A1* | 5/2018 | Ramanujam ...... H04W 56/0005 |
| 2019/0261297 A1 | 8/2019 | Li et al. |
| 2020/0112846 A1* | 4/2020 | Moon .................. H04L 5/0053 |

OTHER PUBLICATIONS

LG Electronics, "Discussion on Initial Access Procedure", 3GPP TSG RAN WG1 Meeting No. 87, R1-1611792, Reno, USA, Nov. 14-18, 2016, 5 pages.

NTT Docomo, "New SID Proposal: Study on New Radio Access Technology", 3GPP TSG RAN Meeting No. 71, RP-160671, Göteborg, Sweden, Mar. 7-10, 2016, 8 pages.

Huawei Hisilicon: "NR Primary and Secondary Synchronization Signals Design", 3GPP Draft: R1-1611261, 3rd Generation Partnership Project (3GPP), Mobile Competence Centre; 650, Route Des Lucioles: F-06921 Sophia-Antipolis Cedex; France, vol. RAN WG1, No. Reno, USA: Nov. 14, 2016-Nov. 18, 2016 Nov. 13, 2016 (Nov. 13, 2016), XP051175242,Retrieved from the Internet: URL: http://www.3gpp.org/ftp/Meetings_3GPP_SYNC/RAN1 /Docs/ [retrieved on Nov. 13, 2016].

* cited by examiner

SYNCHRONISATION AND BROADCASTING BETWEEN BASE STATION AND USER EQUIPMENT

CROSS-REFERENCE TO RELATED APPLICATIONS

The present application is a continuation of U.S. application Ser. No. 16/469,185, filed Jun. 13, 2019, which is based on PCT filing PCT/EP2017/083955, filed Dec. 20, 2017, which claims priority to EP 16206517.1, filed Dec. 22, 2016, the entire contents of each are incorporated herein by reference.

TECHNICAL FIELD

The present disclosure generally pertains to a base station and user equipment for a mobile telecommunications system, which generally pertain to transmission and reception of synchronization signals.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

In LTE, a Physical Broadcast Channel is known which is used for broadcasting system information, such as the master information block (MIB). The PBCH broadcasts a limited number of parameters, which are essential for an initial access to a cell. These parameters pertain, for example, to the downlink system bandwidth, the Physical Hybrid ARQ Indicator Channel structure, and the most significant eight-bits of the System Frame Number.

Typically, in LTE, the UE which wants to get access to a cell performs a cell synchronization and acquires a physical cell ID, time slot and frame synchronization, on the basis of which the UE will be able to read the system information blocks. When the UE tunes to a specific channel it typically finds the primary synchronization signal (PSS). In LTE, the PSS is located in the last OFDM (Orthogonal Frequency-Division Multiplexing) symbol of the first time slot of the first subframe (subframe 0) of a radio frame. In a next step, typically, the UE finds the secondary synchronization signal (SSS), wherein the symbols of the SSS are located in the same subframe as the symbols of the PSS. Based on the SSS, the UE is able to obtain a physical layer cell identity group number (e.g. in a range from 0 to 167). On the basis of this information, the UE is able to get the location of reference signals of the cell, wherein reference signals may be used for channel estimation, cell selection and reselection, handover procedures and the like.

Although there exist techniques for providing the primary and secondary synchronization signals and transmission over a physical broadcast channel, it is generally desirable to improve the existing techniques.

SUMMARY

According to a first aspect, the disclosure provides a base station for a mobile telecommunications system comprising circuitry configured to communicate with at least one user equipment, wherein the circuitry is further configured to set a first subcarrier spacing for transmission of at least one synchronization signal; and set a second subcarrier spacing for transmission on a physical broadcast channel, wherein the first subcarrier spacing differs from the second subcarrier spacing.

According to a second aspect, the disclosure provides a user equipment for a mobile telecommunications system comprising circuitry configured to communicate with at least one base station, wherein the circuitry is further configured to receive at least one synchronization signal and receive a transmission over a physical broadcast channel, wherein the synchronization signal is transmitted with a first subcarrier spacing and the transmission over the physical broadcast channel is transmitted with a second subcarrier spacing, wherein the first subcarrier spacing differs from the second subcarrier spacing.

According to a third aspect, the disclosure provides a base station for a mobile telecommunications system comprising circuitry configured to communicate with at least one user equipment, wherein the circuitry is further configured to indicate, based on a primary synchronization signal, a specific subcarrier spacing for a physical broadcast channel.

According to a fourth aspect, the disclosure provides a user equipment for a mobile telecommunications system comprising circuitry configured to communicate with at least one base station, wherein the circuitry is further configured to receive at least one primary synchronization signal; and to determine, based on the received at least one primary synchronization signal, a subcarrier spacing of a physical broadcast channel.

According to a fifth aspect, the disclosure provides a base station for a mobile telecommunications system comprising circuitry configured to communicate with at least one user equipment, wherein the circuitry is further configured to transmit symbols on a physical broadcast channel, wherein symbols are transmitted with a subcarrier spacing and modulation symbols are repeated in consecutive resource elements in the frequency domain.

According to a sixth aspect, the disclosure provides a user equipment for a mobile telecommunications system comprising circuitry configured to communicate with at least one base station, wherein the circuitry is further configured to receive symbols on a physical broadcast channel, wherein symbols are transmitted with a subcarrier spacing and modulation symbols are repeated in consecutive resource elements in the frequency domain.

According to a seventh aspect, the disclosure provides a base station for a mobile telecommunications system comprising circuitry configured to communicate with at least one user equipment, wherein the circuitry is further configured to transmit symbols in a physical broadcast channel by applying a phase ramp.

According to an eighth aspect, the disclosure provides a user equipment for a mobile telecommunications system comprising circuitry configured to communicate with at least one base station, wherein the circuitry is further configured to receive symbols over a physical broadcast channel, wherein a phase ramp is applied to at least one symbol.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
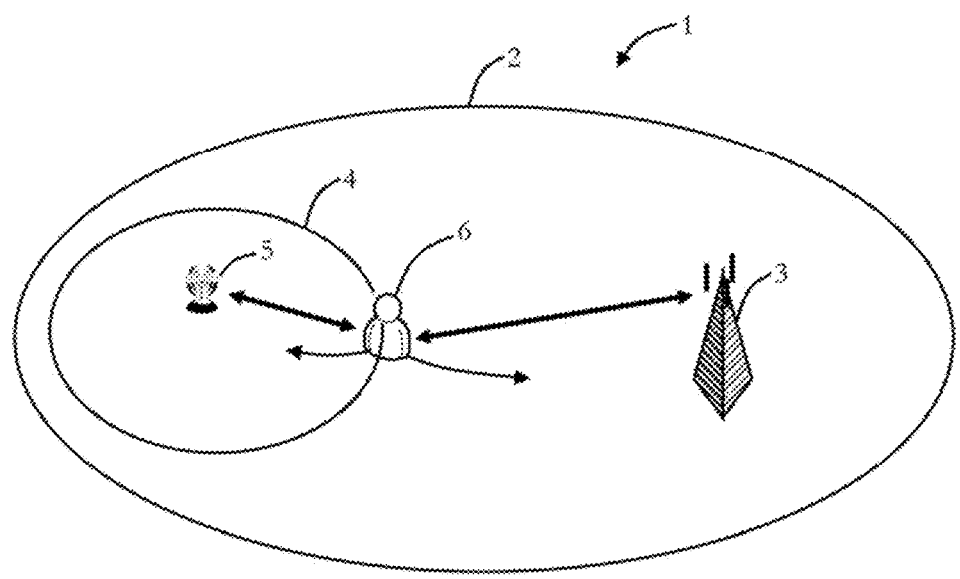
FIG. 1 illustrates an embodiment of a radio access network with a LTE eNodeB and a NR eNodeB.

Before a detailed description of the embodiments under reference of FIG. 1 is given, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR).

An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

In LTE, as mentioned above, a Physical Broadcast Channel is known which is used for broadcasting system information, such as the master information block (MIB). The PBCH broadcasts a limited number of parameters, which are essential for an initial access to a cell. These parameters pertain, for example, to the downlink system bandwidth, the Physical Hybrid ARQ Indicator Channel structure, and the most significant eight-bits of the System Frame Number.

Typically, as mentioned above, in LTE, the UE which wants to get access to a cell performs a cell synchronization and acquires a physical cell ID, time slot and frame synchronization, on the basis of which the UE will be able to read the system information blocks. When the UE tunes to a specific channel it typically finds the primary synchronization signal (PSS). In LTE, the PSS is located in the last OFDM symbol of the first time slot of the first subframe (subframe 0) of a radio frame. In a next step, typically, the UE finds the secondary synchronization signal (SSS), wherein the symbols of the SSS are located in the same subframe as the symbols of the PSS. Based on the SSS, the UE is able to obtain a physical layer cell identity group number (e.g. in a range from 0 to 167). On the basis of this information, the UE is able to get the location of reference signals of the cell, wherein reference signals may be used for channel estimation, cell selection and reselection, handover procedures and the like.

In 3GPP a Study Item (SI) on New Radio Access Technology (NR) has been agreed, as can exemplary be taken from 3GPP document RP-160671, "New SID Proposal: Study on New Radio Access Technology," NTT DOCOMO, RAN #71. On the basis of this SI a new Radio Access Technology (RAT) for the next generation wireless communications system, i.e. 5G, is studied and developed. The new RAT is expected to operate in a wide range of frequencies, in some embodiments, for example, from hundreds of MHz to one hundred GHz and it is expected to cover a broad range of use cases in some embodiments.

Typical use cases that may be considered, e.g. under this SI, are Enhanced Mobile Broadband (eMBB), Massive Machine Type Communications (mMTC), and Ultra Reliable & Low Latency Communications (URLLC).

Typically, for any waking user equipment (UE) accessing a network (e.g. LTE and/or NR network), detecting the primary and secondary synchronization signals (PSS and SSS) provides the UE, for example, with time, frequency and frame synchronization as well as sector, group and cell identity information. Following this, the UE can then find and decode the physical broadcast channel (PBCH), which in turn provides the UE with critical system and configuration information of the particular component carrier. This critical system and configuration information is sometimes referred to as a "Master Information Block", MIB. Whilst the detection of the PSS and SSS entails the processing of signals to detect the random sequences used in their construction, decoding of the PBCH actually entails the channel estimation and equalization, demodulation and forward error correction code decoding of critical system information bits carried by the PBCH.

The PSS and SSS are therefore, in some embodiments, designed to be detectable non-coherently, i.e. in the presence of unknown timing and frequency offsets, whether the UE is stationary or moving. Often, in practice, the PSS is detected first and its processing may provide enough frequency and timing offset correction to allow the subsequent detection of the SSS to be done coherently. The PBCH on the other hand must be decoded coherently. This may mean that apart from the fact that this is done after frequency and timing offset correction, the channel may, or even must, be estimated and equalized before the set of resource elements carrying the critical system information can be demodulated and decoded. Mobile systems may suffer from time and frequency selectivity. Channel estimation therefore may have to contend with these degradations. The time selectivity of the radio channel is due to time-varying fading that arises from relative movement between the UE and the base station, e.g. eNodeB. This time selectivity can be quantified as the coherence time of the transmission channel or Doppler spread which depends on the relative speed of movement between the UE and the base station, e.g. eNodeB. For these reasons, the OFDM symbols carrying the PBCH must be resilient to Doppler spread in some embodiments. OFDM symbol resilience to Doppler spread may be assured by wider subcarrier spacing (SCS) between the subcarriers of the OFDM symbol.

It is known that at higher operating frequencies, a given speed of travel for the UE results in a higher Doppler spread than would be the case for operation at a lower frequency band. The RAN1 3GPP group has decided that the SCS to be used for OFDM symbols carrying the PSS and SSS will be determined according to the operating frequency range for this reason. This may also be implemented in some embodiments. Nevertheless, for networks operating at higher frequency bands, it may be desirable to use a narrower SCS for the PSS and SSS, as this may make time domain detection of the PSS easier at the UE. In such an operating scenario, it may be desirable in some embodiments, for the PBCH to be carried on OFDM symbols with wider subcarrier spacing in order to ensure its robustness to Doppler spread.

Hence, some embodiments provide an efficient means of conveying to the receiver the SCS of the PBCH OFDM symbols, pertain to the issue of how the wider subcarrier spacing of the PBCH symbols can be derived from the SCS of the synchronization symbols in a manner to make its signaling easier, and provide alternative means of carrying the critical system information of the PBCH OFDM symbols even if they use the SCS of the synchronization symbols but in a manner more robust to Doppler spread.

Consequently, some embodiments pertain to a base station, a user equipment and a mobile telecommunications system method, as will also be discussed in the following. The base station and the user equipment each have a circuitry which is configured to perform a method and the mobile telecommunications system method may include the methods as performed by the circuitry of the user equipment and of the base station.

The base station may be based on the principles of LTE (LTE-A) and/or it may be based on NR RAT, as also discussed above. The base station may be based on the known eNodeB of LTE, as one example, or it may be based on the discussed NR eNodeB. The user equipment may be, for example, a mobile phone, smartphone, a computer, tablet, tablet personal computer, or the like, including a mobile communication interface, or any other device which is able to perform a mobile telecommunication via, for example, LTE or NR, such as a hot spot device with a mobile communication interface, etc.

Some embodiments pertain to a base station for a mobile telecommunications system comprising circuitry configured to communicate with at least one user equipment, wherein the circuitry is further configured to set a first subcarrier spacing for transmission of at least one synchronization signal; and set a second subcarrier spacing for transmission on a physical broadcast channel, wherein the first subcarrier spacing differs from the second subcarrier spacing. The synchronization signal may be a primary synchronization signal or a secondary synchronization signal. As mentioned, the transmission may be based, as discussed, on the LTE standard or on a successor. Hence, in some embodiments, a different SCS can be used for synchronization signals (PSS & SSS) and PBCH transmission.

Corresponding embodiments pertain to a user equipment for a mobile telecommunications system comprising circuitry configured to communicate with at least one base station, wherein the circuitry is further configured to receive at least one synchronization signal and receive a transmission over a physical broadcast channel, wherein the synchronization signal is transmitted with a first subcarrier spacing and the transmission over the physical broadcast channel is transmitted with a second subcarrier spacing, wherein the first subcarrier spacing differs from the second subcarrier spacing.

Some embodiments pertain to a base station for a mobile telecommunications system comprising circuitry configured to communicate with at least one user equipment, wherein the circuitry is further configured to indicate, based on a primary synchronization signal, a specific subcarrier spacing for a physical broadcast channel. Hence, some embodiments allow using PSS to signal which SCS is used for PBCH in general and, for example, provide a method of encoding and transmitting that signaling by toggling signs of PSS sequence on both halves of its spectrum.

The primary synchronization signal may include a symbol sequence, as it is generally known, and it may be based on transmission of OFDM symbols.

The symbol sequence may be divided in at least two parts and the specific subcarrier spacing may be indicated, based on the division of the symbol sequence. For example, for each part of the divided symbol sequence, a positive or negative sign may be assigned and the specific subcarrier spacing may be indicated, based on the signs assigned to the parts, as will also be discussed further below. Each part of the divided symbol sequence may be multiplied by the sign assigned to the part. The amount of the specific subcarrier spacing may depend on the number of parts into which the symbol sequence, i.e. the primary synchronization signal is divided and/or the relationship between the amount of the specific subcarrier spacing used on the physical broadcast channel and the number of parts into which symbol sequence is divided may be predefined.

Corresponding embodiments pertain to a user equipment for a mobile telecommunications system comprising circuitry configured to communicate with at least one base station, wherein the circuitry is further configured to receive at least one primary synchronization signal; and to determine, based on the received at least one primary synchronization signal, a subcarrier spacing of a physical broadcast channel. Hence, some embodiments, allow reducing complexity at a receiver side to allow detection of the PBCH SCS signaling on the PSS. As mentioned, the primary synchronization signal may include a symbol sequence, and the symbol sequence may be divided in at least two parts, and the specific subcarrier spacing is determined based on the division of the symbol sequence. For each part of the divided symbol sequence, a positive or negative sign may be assigned and the subcarrier spacing may be determined, based on the signs assigned to the parts. As also discussed, the amount of the subcarrier spacing may depend on the number of parts and/or the amount of the subcarrier spacing may be predefined. The circuitry may be further configured to compute a correlation between parts of the received primary synchronization signal. Thereby, in particular, when a positive/negative sign is assigned to the parts of the primary synchronization signal, the search for subcarrier spacing is reduced, basically, to a sign search.

Some embodiments pertain to a base station for a mobile telecommunications system comprising circuitry configured to communicate with at least one user equipment, wherein the circuitry is further configured to transmit symbols on a physical broadcast channel, wherein symbols are transmitted with (at least) a (first) subcarrier spacing and modulation symbols are repeated in consecutive resource elements in the frequency domain. Although, in some embodiments PBCH symbols are transmitted at one subcarrier spacing in our special repeated pattern, which may have the effect of providing the resilience of a wider subcarrier spacing, in some embodiments, the symbols may be transmitted with different subcarrier spacings. Hence, in some embodiments, an increasing of the SCS of PBCH is provided by repetition of QAM symbols over REs (resource elements). For example, if a base SCS is 15 kHz a repetition of symbols of four times results in an effective SCS of 60 kHz. Thereby, a guard band which may be needed in known systems, can be made obsolete. The symbols may include quadrature amplitude modulation symbols.

Corresponding embodiments pertain to a user equipment for a mobile telecommunications system comprising circuitry configured to communicate with at least one base station, wherein the circuitry is further configured to receive symbols on a physical broadcast channel, wherein symbols are transmitted with (at least) a (first) subcarrier spacing and modulation symbols are repeated in consecutive resource elements in the frequency domain. As mentioned, the symbols may include quadrature amplitude modulation symbols. The receiving of symbols may include decoding the repeatedly transmitted symbol based on the first subcarrier spacing and/or the receiving of the symbols may include decoding the repeatedly transmitted symbol based on a second subcarrier spacing. Hence, in some embodiments, the receiver approach in decoding such repeated QAM symbols either uses the base SCS and then combines the result prior to demodulation (where the process of demodulation includes the generation of log-likelihood rations in some exemplary embodiments) or it uses decoding with the composite and larger SCS.

Some embodiments pertain to a base station for a mobile telecommunications system comprising circuitry configured to communicate with at least one user equipment, wherein the circuitry is further configured to transmit symbols in a physical broadcast channel by applying a phase ramp, as will also be discussed further below. Hence, some embodiments allow carrying PBCH in a more robust manner by exploiting processing gain instead of FEC coding, this may reduce the number of bits to be transmitted allowing more compact transmission. Each burst of the physical broadcast channel may include a reference symbol. The reference symbol may be based on a Zadoff-Chu sequence. A root of the Zadoff-Chu sequence may differ from a root of a Zadoff-Chu sequence used for a primary synchronization signal. The phase ramp may be based on a phase shift applied to a previous symbol. The phase shift may be spread over $2\pi$.

Corresponding embodiments pertain to a user equipment for a mobile telecommunications system comprising circuitry configured to communicate with at least one base station, wherein the circuitry is further configured to receive symbols over a physical broadcast channel, wherein a phase ramp is applied to at least one symbol and the bursts of the physical broadcast channel are repeated once. Hence, some embodiments provide a receiving side including decoding the phase shifts, CRC checking, potentially exiting after the first two bursts if the CRC passes, and if the CRC fails storing and combining results prior to IFFT and peak detection and CRC checking a second time. The phase ramp may be estimated on at least one symbol of a burst of the physical broadcast channel and a burst reference sequence. The phase ramp may be detected based on an inverse discrete Fourier transformation.

All embodiments disclosed herein can be combined, such that, for example also embodiments exist where a base station implements all or any sub-combination of base station features as described herein and a user equipment implements all or any sub-combination of user equipment features as described herein.

Returning to FIG. 1, there is illustrated a RAN 1 which has a macro cell 2, which is established by a LTE eNodeB 3, and a NR cell 4, which is established by a NR eNodeB 5.

A UE 6 can communicate with the LTE eNodeB 3 and, as long it is within the NR cell 4, it can also communicate with the NR eNodeB 5. As mentioned above, for example, when the UE 6 wakes up, it may search for the primary and secondary synchronization signals.

Figure 2:
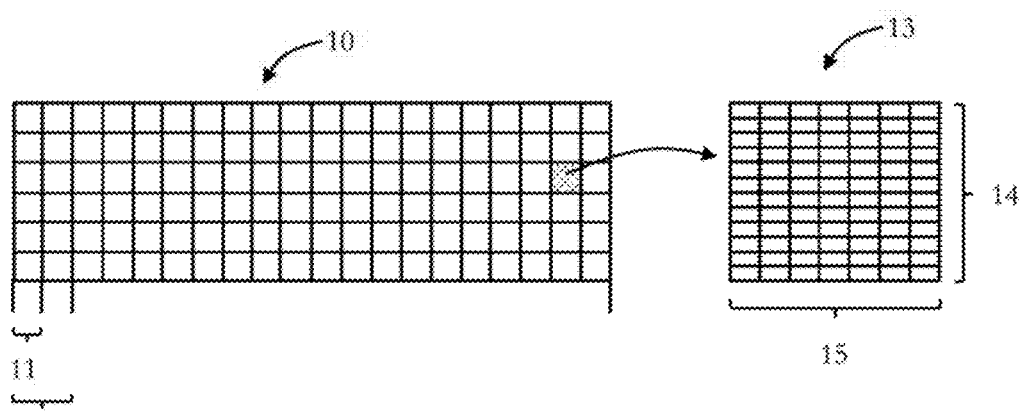
FIG. 2 illustrates a LTE FDD frame and a resource block.

Although the communication according to LTE is generally known, FIG. 2 schematically and exemplary illustrates an FDD (Frequency Division Duplexing) frame 10 which has a length of 10 ms. Each vertical line corresponds to one slot 11 and two slots form a subframe 12. One slot includes in this example six resource blocks, wherein one resource block 13 is depicted on the right side of the frame 10.

Each resource block is divided into twelve subcarriers 14, wherein each of the subcarriers 14 is carried on seven OFDM symbols 15. The PBCH may be located in a different slot of the same subframe, e.g. in the next slot following slot 11.

As mentioned above, in LTE, the PSS is located in the last OFDM (Orthogonal Frequency-Division Multiplexing) symbol of the first time slot of the first subframe (subframe 0) of a radio frame, such as radio frame 10. In frame 10, the first time slot is time slot 11 in the first subframe 12, i.e. the most left vertical structure of six resource blocks. In a first step, the UE decodes the primary synchronization signal (PSS). In a next step, typically, the UE finds the secondary synchronization signal (SSS), wherein the symbols of the SSS are located in the same subframe as the symbols of the PSS.

In LTE-A, the PSS is composed of one of three sequences. Detecting any one of these sequences at the UE, e.g. UE 6, indicates that the component carrier is transmitted from one of three possible sectors of the (NR) eNodeB, e.g. eNodeB 5. The SSS on the other hand carries two 31 element sequences which can be arranged in one of 168 possible ways. Between the PSS and SSS can therefore be signaled 504 different cell identities ranging from 0 to 3*167+2=503.

Figure 3:
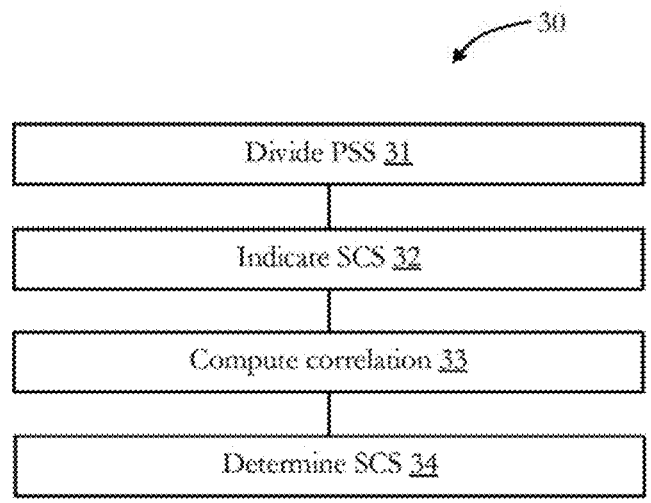
FIG. 3 illustrates a flowchart for a mobile telecommunications system method.

In the following, an embodiment pertaining to signaling the SCS by use of the PSS is discussed under reference of FIG. 3, which is a flowchart of a mobile telecommunications method 30 which can be performed by a (NR) base station, such as eNodeB 5 and a user equipment, such as UE 6. Moreover, the SCS of the PSS and of the PBCH may differ from each other, as will be discussed below.

In this embodiment, the PSS is structured to also convey information of the SCS that will be used for the PBCH for indicating which amount of SCS is used. Here, the used PSS sequence is exemplary divided at 31, e.g. by the eNodeB, into two halves (in other embodiments it could be divided into more parts).

Let the basic sequence used for the PSS be designated as $\ddot{Z}_i(n)$ n=0, 1, ..., N and i∈{0, 1, 2} then the modified used PSS sequence $Z_i(n)$ would be:

$$Z_i(n) = \begin{cases} S_L * \ddot{Z}_i(n) & \text{for } n \leq \frac{N}{2} \\ 0 & \text{for } n = \left\lceil \frac{(N+1)}{2} \right\rceil \\ S_H * \ddot{Z}_i(n) & \text{for } n > \left\lceil \frac{(N+1)}{2} \right\rceil \end{cases}$$

Where (N+1) (often odd) is the length of the sequence. In LTE, N=62.

With the binary variables $S_L$ and $S_H$, at least 4 different SCS for the PBCH symbols can be signaled as in Table 1, whereby at 32 the SCS may be indicated, e.g. by the eNodeB 5. Hence, for each half and the associated SCS used in the PBCH, a sign is assigned at 32 for indicating the SCS.

TABLE 1

Example settings for signaling of PBCH subcarrier spacing

| $S_L$ | $S_H$ | PBCH SCS, a |
|---|---|---|
| 1 | 1 | 0 |
| 1 | −1 | 1 |
| −1 | 1 | 2 |
| −1 | −1 | 3 |

The entry a in the PBCH SCS column of Table 1 may be a scale factor such that the SCS of the PBCH OFDM symbols is $2^a$ (i.e. 2^a) times the SCS of the OFDM symbol carrying the PSS. Therefore, when a=0, the SCS of the PBCH OFDM symbols is the same as that of the OFDM symbol carrying the PSS. In another embodiment, a could be the index to a table of SCS values, such that thereby the SCS used can be indicated at 32. The table may directly include SCS values or it may even point to another table, or it may include a formula for calculating SCS values, etc.

This approach might be seen as increasing the number of sequences to search through at the UE by a factor of four, thereby quadrupling the amount of processing for PSS detection. However, because the SCS signaling is only carried in the sign of halves of the original PSS sequence, the processing complexity can be considerably reduced by computing the correlation with the original sequence $Z_i(n)$ in two halves at the UE receiving side at 33. Assuming the received sequence is R(n), then the half-correlations for a given index k is:

$$X_L(k) = \sum_{n=0}^{\frac{N}{2}} Z_i(n) * R^*(n+k)$$

$$X_H(k) = \sum_{n=\left\lceil \frac{(N+1)}{2} \right\rceil}^{N} Z_i(n) * R^*(n+k)$$

Then to find the correlation for the various entries in Table 1, the different correlation results X(k) are derived as illustrated in Table 2.

TABLE 2

Computation of correlation results related to PBCH SCS signaling

| $S_L$ | $S_H$ | X(k) |
|---|---|---|
| 1 | 1 | \|$X_L(k) + X_H(k)$\| |
| 1 | −1 | \|$X_L(k) - X_H(k)$\| |
| −1 | 1 | \|$-X_L(k) + X_H(k)$\| |
| −1 | −1 | \|$-X_L(k) - X_H(k)$\| |

The sign search therefore entails only toggling of the signs of each half correlation systematically before summing up the results, which may be a miniscule change in complexity in some embodiments. Based on the signs found in the sign search, the UE 6 determines the SCS at 34.

As mentioned, the disclosure is not restricted to signal only four SCS, any other number of SCS can also be signaled using this method, e.g. by dividing the PSS sequence in more than two parts.

Figure 4:
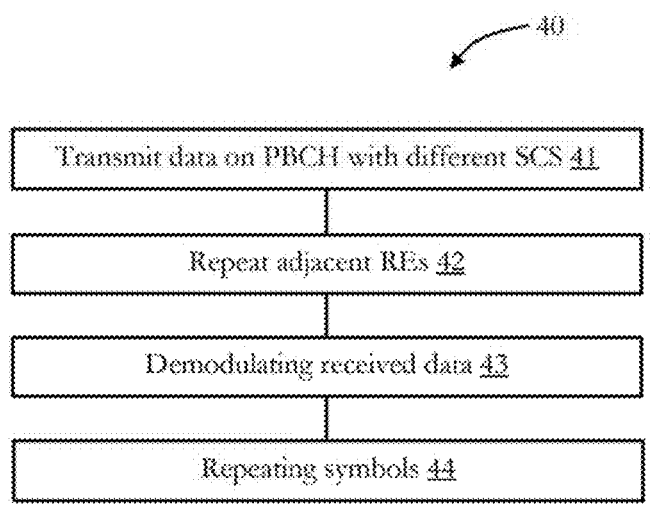
FIG. 4 illustrates a flowchart for a further mobile telecommunications system method.
Figure 5:
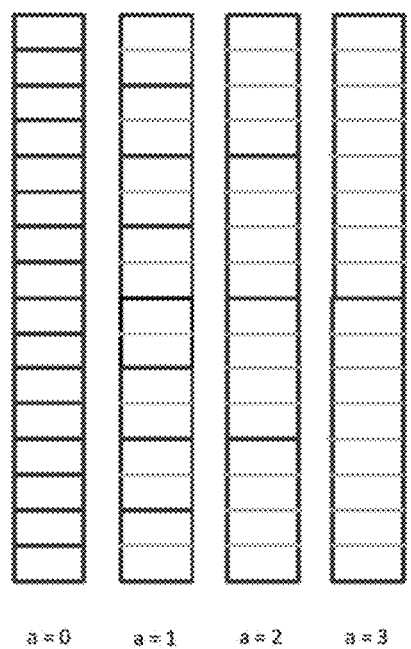
FIG. 5 illustrates a subcarrier scaling.

In the following, an embodiment pertaining to the implicit scaling of the PBCH SCS is discussed under reference of FIGS. 4 and 5. FIG. 4 is a flowchart of a mobile telecommunications method 40 which can be performed by a base station, such as eNodeB 5 and a user equipment, such as UE 6. FIG. 5 illustrates subcarrier scaling by QAM symbol repetition.

The SCS used for the payload data (i.e. data transmitted on PDSCH, which is transmitted, for example in the first subframe in one or both slots) can differ between subframes or slots of the same component carrier or between base stations of the same PLMN (Public Land Mobile Network).

In an exemplary embodiment, the subcarrier spacings that can be used are power of two multiples of each other, while in other embodiments, as discussed above, the OFDM symbols are repeated by a specific (integer) number, e.g. three times, which may result in a 45 kHz SCS, if the base SCS is 15 kHz, or five times, which may result in a 75 kHz SCS, if the base SCS is 15 kHz (without limiting the present disclosure to these examples). The PBCH is not expected to use all the resource elements (RE) in each of the OFDM symbols it is carried on. Therefore, the PBCH carrying OFDM symbols has to carry payload (PDSCH) or other signals on the same OFDM symbol. If the PBCH is to use for data transmission at 41 by e.g. eNodeB 5 a wider SCS than the rest of the data that shares its OFDM symbols and the PBCH REs use a different SCS than the other REs of the same OFDM symbol, then there may be need for guard bands separating the zones of differing SCS in order to avoid interference arising from the differences in SCS.

The present embodiment provides a solution where a guard band may be not needed and, therefore, may be obsolete by repeating adjacent resource elements in the PBCH carrying REs, performed at 42, e.g. by eNodeB 5. Therefore, for PBCH SCS of a in Table 1, each PBCH QAM symbol would be mapped to $2^a$ (i.e. 2^a) adjacent REs. This is illustrated for a=0, 1, 2, 3 in FIG. 5.

In each vertical grid, the grey lines indicate repetition boundaries while the black lines indicate change of a QAM symbol, such that for a=0 no repetition is present, for a=1 two repetitions, for a=2 four repetitions and for a=3 eight repetitions. Transmitted with this arrangement, each PBCH carrying OFDM symbol can be equalized as a signal with SCS corresponding to a=0 in which case, after equalization the REs carrying repetitions of the same QAM symbol should be maximal ratio combined prior to QAM de-mapping. The PBCH carrying OFDM symbol can also be equalized as a signal with SCS=$2^a$ (i.e. 2^a) to avoid the maximal ratio combining and increase resilience to Doppler spread.

For a fixed number of bits in the PBCH this repetition reduces the PBCH carrying capacity of each OFDM symbol by a factor of 2a (i.e. 2^-a). It therefore follows that for the same bandwidth, the number of OFDM symbols required to carry the PBCH would increase by a factor of $2^a$ (i.e. 2^a). On the other hand, since it is possible to think of the REs as having a bandwidth of $2^a$ (i.e. 2^a) times the basic SCS, assigning the same number of these wider REs per OFDM symbol to carry the PBCH as before requires that the raw bandwidth allocated for PBCH should increase to $2^a$ (i.e. 2^a) times what it was with the basic SCS. In this embodiment, the number of OFDM symbols necessary to carry one PBCH remains the same as before repetition.

When this repetition approach is taken, then the reference symbols used for demodulating the PBCH at 43 have to be similarly repeated or distributed at 44 taking into account the $2^a$ (i.e. 2^a) scaling of the SCS, wherein this is performed e.g. by UE 6. Alternatively, the PBCH can be decoded using the PSS and/or SSS as reference symbols, in which case there is no need for reference symbols within the PBCH structure.

Despite the above analysis comparing repetition versus non-repetition, it should be understood that in Rel 13 of LTE, the PBCH transmits 40 bits (24 bits+16 CRC bits). These bits are coded with a combination of an actual 1/3-rate code and repetition coding to an aggregate code rate of 1/48 giving a total of 1920 bits for the output block size. This block is then broken up into 4 bursts each of 480 bits, each to be modulated by QPSK modulation and transmitted in a subframe using 240 REs.

Using this disclosure to increase the SCS by $2^a$ (i.e. 2^a) for the PBCH OFDM symbols, as discussed above, the repetition code rate can be proportionally increased to $2^a/48$ in some embodiments. For example, let a=3 so that $2^a$=8. Then the effective aggregate code rate can be increased to 8/48=1/6 i.e. after the 1/3-rate code, a repetition code rate of 2 is applied, instead of 1/16 as before. The PBCH output coded block size is now 40*6=240 bits. As in Rel-14 of LTE, this is divided into 4 equal bursts each of 60 bits modulated into 30 QPSK symbols. A SCS=$2^a$ entails repeating each QPSK symbol over 8 adjacent REs. Thus the 30 QPSK symbols of each burst would still occupy 30*8=240 REs in the subframe as before. Therefore, there is no overall increase in required REs. However, in some embodiments, there is some loss of coding gain because of the higher aggregate code rate. This is more than made up for by the diversity gain arising from repeating each QPSK symbol 8 times. Thus, the PBCH still occupies 480 physical bits/subframe (and still occupies 1.08 MHz with SCS=15 kHz and the time taken to transmit 4 subframes).

Figure 6:
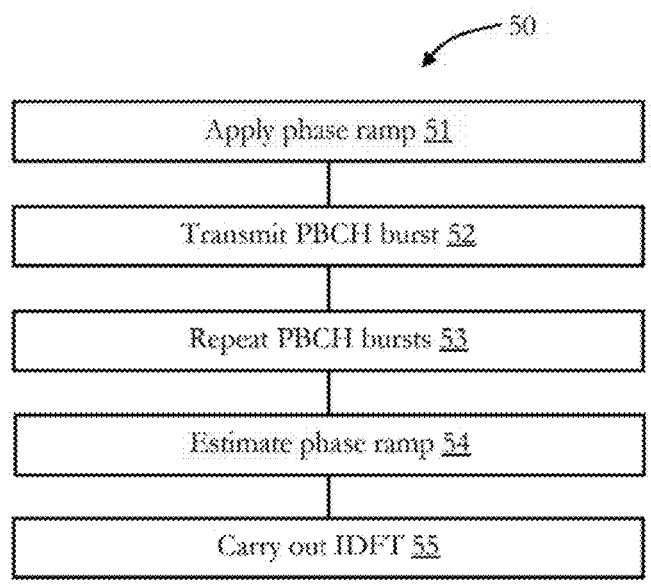
FIG. 6 illustrates a flowchart for a further mobile telecommunications system method.
Figure 7:
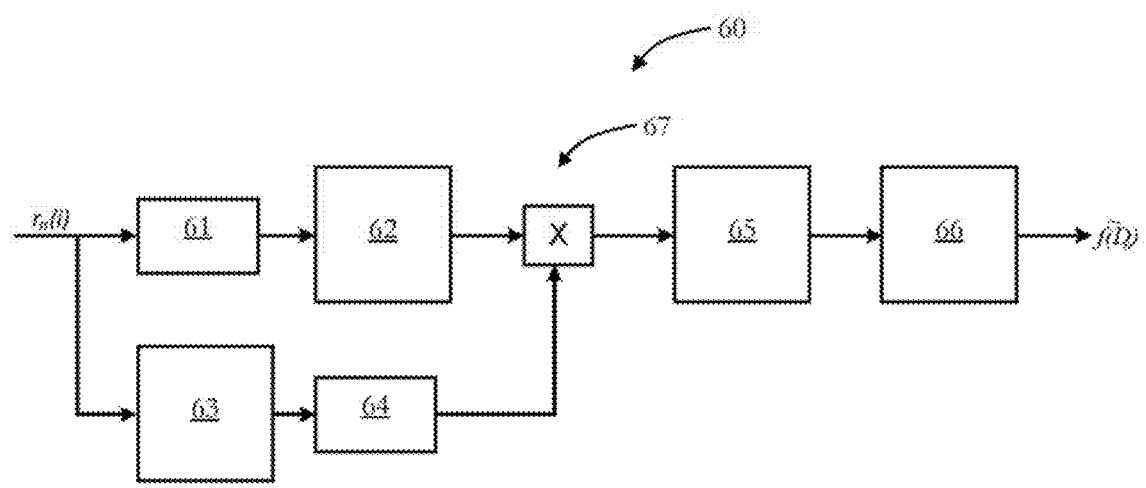
FIG. 7 illustrates the functionality of a receiver algorithm.

In the following, an embodiment pertaining to a more robust method to carry the PBCH in OFDM symbols of smaller SCS is discussed under reference of FIGS. 6 and 7. FIG. 6 is a flowchart of a mobile telecommunications method 50 which can be performed by a base station, such as eNodeB 5 and a user equipment, such as UE 6. FIG. 7 schematically illustrates a receiver of a UE, such as UE 6.

The repetition of QAM symbols on adjacent REs, as discussed above, may have, in some embodiments, the deleterious effect of either requiring an increase in the number of OFDM symbols carrying the PBCH or increasing the raw bandwidth of the PBCH.

Increasing the raw bandwidth may not be feasible if the expected raw bandwidth exceeds the component carrier bandwidth. The increased bandwidth may also result in an increase in power consumption for the UE because of the wider bandwidth to be tuned.

On the other hand, if the raw bandwidth is kept constant and the number of OFDM symbols is increased instead, this increase in the number of symbols results in delay in decoding of the PBCH.

It is therefore desirable, in some embodiments, to minimize as much as possible the factor $2^a$ (i.e. 2^a) as this minimizes either the required increase in bandwidth or number of OFDM symbols. It may still be desirable to have $2^a$>1 (wider SCS for the PBCH), but if the PBCH information can be carried more robustly, the factor $2^a$ may be set to 2 or 4 instead of 8. This would reduce the necessary bandwidth or number of PBCH carrying symbols significantly in some embodiments.

In LTE-A, the PBCH after CRC protection is made up of 40 bits before error control coding is applied to it. By substituting processing gain for coding gain, the FEC coding of the PBCH can be dispensed with. The 40 bit PBCH is split into eight fields each of five bits long. Each burst of PBCH bearing OFDM symbols is comprised of five OFDM symbols, the first being a burst reference symbol, whose REs align with those of the following four burst PBCH symbols. The reference symbol carries a burst reference sequence in the REs reserved for the PBCH.

In an embodiment, the burst reference sequence is a particular Zadoff-Chu (ZC) sequence, which is generally known, with a different root than the sequences used for the PSS. In another embodiment, the chosen ZC sequence is also multiplied by an N chip m-sequence to improve its autocorrelation properties (in LTE Rel-14, N=62).

Each of the following four PBCH symbols of the burst carries one of the PBCH fields by applying a calculated phase ramp at 51, e.g. by the eNodeB 5, to each of the REs of a copy of the burst reference symbol. The phase ramp to apply is calculated from the sum of the decimal value of the five bits PBCH field and the phase shift applied to the previous symbol. Since each burst carries only four PBCH fields, it therefore takes two PBCH bursts at 52, e.g. performed by the eNodeB 5, to carry all the eight fields of the PBCH. In LTE-A, the PBCH is carried over four bursts (one burst is transmitted per radio frame over a period of 40 ms). Equivalently, in an embodiment of this case, the two bursts carrying all the fields of the PBCH are repeated at 53, e.g. performed by the eNodeB 5, once per 40 ms period (e.g. the first burst is transmitted in the first and third radio frames of a 40 ms period and the second burst is transmitted in the second and fourth radio frames of the 40 ms period).

In one embodiment, the relative phase shift $M_0$ applied to the reference symbol is substantially zero but can be some other fixed and known value. Then the sequence for the REs of PBCH burst symbol n will be:

$$S_n(k)=Z(k)*e^{j2\pi k(M_{n-1}+f(D_n))/N_{FFT}}$$

$$M_n=(M_{n-1}+f(D_n)) \bmod N_{FFT}$$

For n=1, 2, 3, 4 and where $D_n$ (i.e. D_n) is the decimal value of the 5-bits field allocated for transmission in symbol n, Z(k) is the burst reference symbol sequence and $N_F$ is the size of the DFT used for converting the PBCH time domain symbol into the frequency domain. With $0 \leq D_n \leq 31$, there are therefore only 32 possible valid phase shifts that can be applied to the reference sequence. However, the reference sequence has length $N_{FFT}$ which is more than 32. This means the quantization of the phase shifts can be significantly coarser. This is done by use of the function $f(\cdot)$ ("·" being a placeholder) on the decimal value of the PBCH field. The effect of this function is to spread the possible phase shifts uniformly over $2\pi$. The function $f(\cdot)$ therefore converts the number $0 \leq D_n \leq 31$ to a number $0 \leq f(D) \leq N_{FFT}$ where in general, $D_n \leq N_{FFT}$.

At the receiver, e.g. performed by the UE 6, the phase ramps can be estimated at 54 without explicit channel estimation and correction since the UE knows the symbols of the PBCH burst and the burst reference sequence Z(k).

Thus for the sequence of the REs of the PBCH burst symbol n and assuming the received resource elements are $R_n(k)$ and that the channel H(k) is relatively stationary between symbols n−1 and n, the UE can compute (ignoring the index k, "·" is an abbreviation for a (dot) product):

$$R_{n-1}R^*_n=(H\cdot Z\cdot e^{-2\pi M_{n-1}/N_{FFT}}+N_{n-1})^*(H\cdot Z\cdot e^{-j2\pi(M_{n-1}+f(D_n))/N_{FFT}}+N_n)^*$$

Where $N_n$ is the noise on symbol n. This can be expanded as follows:

$$R_{n-1}R^*_n=|H|^2|Z|_2 e^{j2\pi f(D_n)/N_{FFT}}+H\cdot Z\cdot e^{-j\alpha}\cdot N_n^*+H^*\cdot Z^*\cdot e^{-j\beta}\cdot N_{n-1}+N_{n-1}\cdot N_n^*$$

where $\beta=2\pi(M_{n-1}+f(D_n))/N_{FFT}$ and $\alpha=2\pi M_{n-1}/N_{FFT}$.

The second and third terms of the right-hand side are modulated noise whilst the last term is just plain white noise. As all the noise is additive, the combined power of these terms depends on the SNR of the received signal. It can therefore be expected in some embodiments that, at reasonable levels of SNR, the argument or phase trajectory of the result would be dominated by the first term on the right. Thus by detecting the phase slope of the result, $f(D_n)$ can be detected, i.e. the relative phase ramp between the two symbols. Further, this phase ramp can also be detected by carrying out an IDFT at 55 on the result and taking the sample location of the peak amplitude since:

$$\text{IFFT}(e^{-j2\pi nk/N_{FFT}})=\text{FFT}(e^{j2\pi nk/N_{FFT}})/N_{FFT}$$

Where, for example (as, e.g. also in LTE), $N_{FFT}=64$. The actual decimal number $D_n$ can then be found by passing the detected sample location through the inverse function $f^{-1}(\cdot)$.

Taking LTE as an example in which $N_{FFT}=64$, an example function $f(\cdot)$ for spreading all the possible phase shifts uniformly from 0 to $2\pi$ could be:

$$f(n)=2*n \rightarrow f^{-1}(n)=n/2$$

In other embodiments $f(n)$ can also take into account the known Gray coding such that any two possible phase shifts that are close in value to each other are derived from values of n that only differ by one bit.

A functional receiver algorithm 60, as may be implemented in UE 6, which may perform the receiving steps discussed above, is illustrated in FIG. 7. The algorithm 60 has a "Delay $N_u$" part 61, a first FFT (Fast Fourier Transform) part 62 and a second FFT part 63, a conjugate part 64, an IFFT (inverse FFT) part 65, and a peak detection function part 66, where $N_u$ (i.e. N_u) in the "Delay $N_u$" part 61 is the number of time domain samples in one OFDM symbol (excluding the cyclic prefix) and the input $r_n(i)$ (i.e. r_n(i)) is assumed to be already stripped of the cyclic prefixes.

The input $r_n(i)$ (i.e. r_n(i)) is split into a first part and a second part. The first part is delayed by part 61, while the second part is input into the second FFT 63 and the conjugate part 64 calculates the conjugate of the output of FFT 63. After delaying the first part, it is input into FFT 62 and the output of FFT 62 is multiplied at 67 with the output of 64. The multiplied output is fed to IFFT part 65 (more generally an IDFT) which calculates the IFFT, as discussed above. The output of 65 is fed to part 66, which performs peak detection of the output of the IFFT and calculates the inverse function of the input, whereby the $D_n$ can be derived.

In an embodiment where the two bursts carrying all the fields of the PBCH are repeated once, each PBCH field is transmitted twice. This means the CRC can be checked after decoding all fields at the end of the second PBCH burst. If the CRC passes, PBCH decoding can be said to have succeeded and the remaining two bursts can then be ignored. Otherwise, the third and fourth bursts are also received, decoded and the CRC checked again. It is expected, in some embodiments, that one of the CRCs passes.

In another embodiment of the receiver (for the case where the two bursts carrying all the fields of the PBCH are repeated once and hence each PBCH field is transmitted twice), the outputs of the multiplier 67 in FIG. 7 for each of the PBCH fields carrying symbols can be stored separately during reception of the first two bursts. Then during reception of the third and fourth bursts, the output of the multiplier 67 can be combined with that of the equivalent symbols previously stored from the first two bursts and the result of this combiner passed through the IFFT and peak detection. The diversity combining improves the reliability of the detected phase slopes.

In some embodiments, carrying of information in a preprocessing of a known sequence carried on an OFDM symbol is known and used for the ATSC3.0 bootstrap signal. In that case, the values are carried in a time-domain cyclic shift of a whole OFDM symbol. In this case, we are carrying the information in a phase ramp restricted to the resource elements allocated for the PBCH. All other resource elements of the symbol are left unchanged.

As mentioned above, embodiments may be combined. For example, in some embodiments, the embodiments of FIGS. 1 to 7 are combined. Also the embodiments of FIGS. 3 to 7 may be combined, or the embodiments of FIGS. 3 and 6 to 7, or the embodiments of FIGS. 3 and 4 to 5, etc. Some embodiments may pertain to a combination of the embodiments of FIGS. 4 to 7. In particular, in some embodiments, the methods 30, 40 and 50 are combined to one method, or the methods 30 and 40 are combined to one method, or the methods 30 and 50 are combined to one method. Some embodiments may pertain to a combination of methods 40 and 50.

Figure 8:
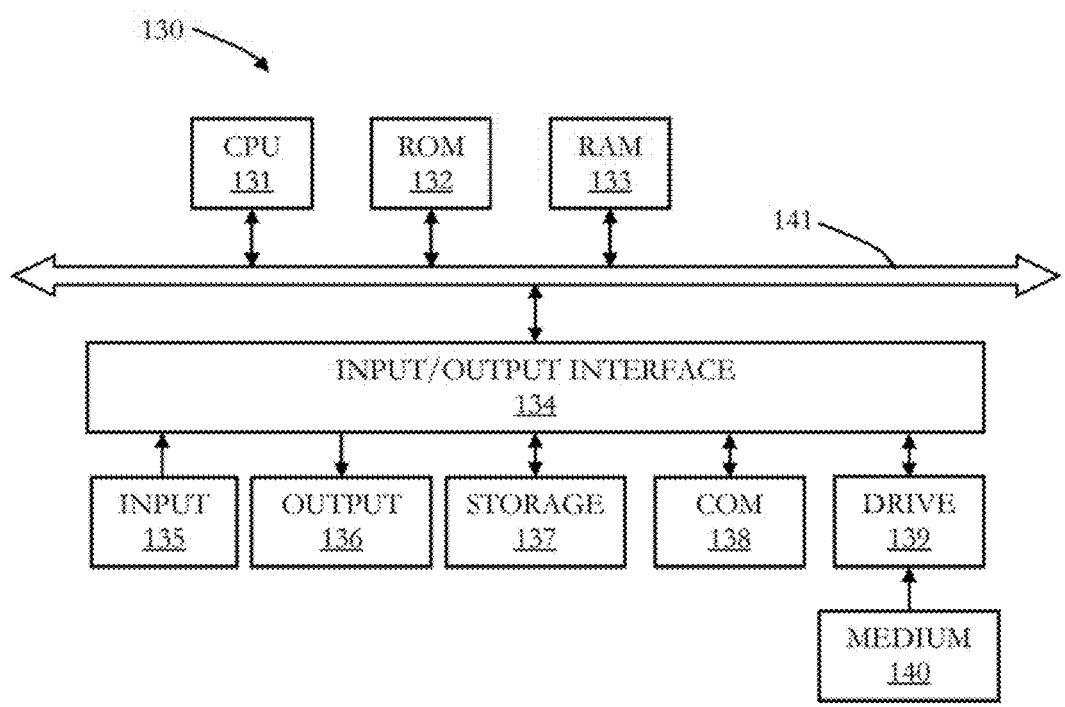
FIG. 8 illustrates inclusion of a multi-purpose computer which can be used for implementing a base station and/or user equipment.

In the following, an embodiment of a general purpose computer 130 is described under reference of FIG. 8. The computer 130 can be implemented such that it can basically function as any type of base station or new radio base station, transmission and reception point, or user equipment as described herein. The computer has components 131 to 140, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station, and user equipment.

At the input/output interface 134 several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor and/or circuitry, such as the processor and/or circuitry described above, causes the methods described herein to be performed.

It should be recognized that the embodiments describe methods with an exemplary order of method steps. The specific order of method steps is, however, given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A base station for a mobile telecommunications system comprising circuitry configured to communicate with at least one user equipment, wherein the circuitry is further configured to:
set a first subcarrier spacing for transmission of at least one synchronization signal; and
set a second subcarrier spacing for transmission on a physical broadcast channel, wherein the first subcarrier spacing differs from the second subcarrier spacing.

(2) The base station of (1), wherein the synchronization signal is a primary synchronization signal or a secondary synchronization signal.

(3) A user equipment for a mobile telecommunications system comprising circuitry configured to communicate with at least one base station, wherein the circuitry is further configured to:
receive at least one synchronization signal and receive a transmission over a physical broadcast channel, wherein the synchronization signal is transmitted with a first subcarrier spacing and the transmission over the physical broadcast channel is transmitted with a second subcarrier spacing, wherein the first subcarrier spacing differs from the second subcarrier spacing.

(4) A base station for a mobile telecommunications system comprising circuitry configured to communicate with at least one user equipment, wherein the circuitry is further configured to:
indicate, based on a primary synchronization signal, a specific subcarrier spacing for a physical broadcast channel.

(5) The base station of (4), wherein the primary synchronization signal includes a symbol sequence.

(6) The base station of (5), wherein the symbol sequence is divided in at least two parts and the specific subcarrier spacing is indicated, based on the division of the symbol sequence.

(7) The base station of (6), wherein for each part of the divided symbol sequence, a positive or negative sign is assigned.

(8) The base station of (7), wherein the specific subcarrier spacing is indicated, based on the signs assigned to the parts.

(9) The base station of anyone of (6) to (8), wherein the amount of the specific subcarrier spacing depends on the number of parts.

(10) The base station of (9), wherein the amount of the specific subcarrier spacing of the physical broadcast channel and the number of parts into which the symbol sequence is divided is predefined.

(11) A user equipment for a mobile telecommunications system comprising circuitry configured to communicate with at least one base station, wherein the circuitry is further configured to:
receive at least one primary synchronization signal; and
determine based on the received at least one primary synchronization signal a subcarrier spacing of a physical broadcast channel.

(12) The user equipment of (11), wherein the primary synchronization signal includes a symbol sequence.

(13) The user equipment of (12), wherein the symbol sequence is divided in at least two parts and the specific subcarrier spacing is determined based on the division of the symbol sequence.

(14) The user equipment of (13), wherein for each part of the divided symbol sequence, a positive or negative sign is assigned.

(15) The user equipment of (14), wherein the specific subcarrier spacing is determined, based on the signs assigned to the parts.

(16) The user equipment of anyone of (13) to (15), wherein the amount of the specific subcarrier spacing depends on the number of parts.

(17) The user equipment of (16), wherein the amount of the specific subcarrier spacing of the physical broadcast channel and the number of parts into which the symbol sequence is divided is predefined.

(18) The user equipment of anyone of (13) to (17), further comprising computing a correlation between parts of the received primary synchronization signal.

(19) A base station for a mobile telecommunications system comprising circuitry configured to communicate with at least one user equipment, wherein the circuitry is further configured to:
transmit symbols on a physical broadcast channel, wherein symbols are transmitted with a subcarrier spacing and modulation symbols are repeated in consecutive resource elements in the frequency domain.

(20) The base station of (19), wherein the symbols include quadrature amplitude modulation symbols.

(21) A user equipment for a mobile telecommunications system comprising circuitry configured to communicate with at least one base station, wherein the circuitry is further configured to:
receive symbols on a physical broadcast channel, wherein symbols are transmitted with a subcarrier spacing and modulation symbols are repeated in consecutive resource elements in the frequency domain.

(22) The user equipment of (21), wherein the symbols include quadrature amplitude modulation symbols.

(23) The user equipment of (21) or (22), wherein the receiving of the symbols includes decoding the repeatedly transmitted symbol based on the subcarrier spacing.

(24) The user equipment of anyone of (21) to (23), wherein the receiving of the symbols includes decoding the repeatedly transmitted symbol based on a second subcarrier spacing.

(25) A base station for a mobile telecommunications system comprising circuitry configured to communicate with at least one user equipment, wherein the circuitry is further configured to:
transmit symbols in a physical broadcast channel by applying a phase ramp.

(26) The base station of (25), wherein each burst of the physical broadcast channel includes a reference symbol.

(27) The base station of (26), wherein the reference symbol is based on a Zadoff-Chu sequence.

(28) The base station of (27), wherein a root of the Zadoff-Chu sequence differs from a root of a Zadoff-Chu sequence used for a primary synchronization signal.

(29) The base station of anyone of (25) to (28), wherein the phase ramp is based on a phase shift applied to a previous symbol.

(30) The base station of anyone of (25) to (29), wherein a phase shift of the phase ramp is spread over $2\pi$.

(31) A user equipment for a mobile telecommunications system comprising circuitry configured to communicate with at least one base station, wherein the circuitry is further configured to:
receive symbols over a physical broadcast channel, wherein a phase ramp is applied to at least one symbol.

(32) The user equipment of (31), wherein the phase ramp is estimated on at least one symbol of a burst of the physical broadcast channel and a burst reference sequence.

(33) The user equipment of (31) or (32), wherein the phase ramp is detected based on an inverse discrete Fourier transformation.

The invention claimed is:

1. A base station for a mobile telecommunications system, the base station comprising:
circuitry configured to:
communicate with at least one user equipment; and
transmit symbols on a physical broadcast channel (PBCH) with a subcarrier spacing, wherein
modulation symbols are repeated in consecutive resource elements in a frequency domain,
each burst of the PBCH with the subcarrier spacing includes a reference symbol repeated in the consecutive resource elements,
the subcarrier spacing of the PBCH differs from a subcarrier spacing of a primary synchronization signal,
the primary synchronization signal includes a synchronization sequence,
a sign of one part of the synchronization sequence corresponds to the subcarrier spacing of the primary synchronization signal, and
a sign of another part of the synchronization sequence corresponds to the subcarrier spacing of the PBCH.

2. The base station of claim 1, wherein the symbols include quadrature amplitude modulation symbols.

3. The base station of claim 1, wherein the reference symbol is for demodulation of the PBCH.

4. A user equipment for a mobile telecommunications system, the user equipment comprising:
circuitry configured to:
communicate with at least one base station; and
receive symbols on a physical broadcast channel (PBCH) with a subcarrier spacing, wherein
modulation symbols are repeated in consecutive resource elements in a frequency domain,
each burst of the PBCH with the subcarrier spacing includes a reference symbol repeated in the consecutive resource elements,
the subcarrier spacing of the PBCH differs from a subcarrier spacing of a primary synchronization signal,
the primary synchronization signal includes a synchronization sequence,
a sign of one part of the synchronization sequence corresponds to the subcarrier spacing of the primary synchronization signal, and
a sign of another part of the synchronization sequence corresponds to the subcarrier spacing of the PBCH.

5. The user equipment of claim 4, wherein the symbols include quadrature amplitude modulation symbols.

6. The user equipment of claim 4, wherein the circuitry is further configured to decode repeatedly transmitted symbols based on the subcarrier spacing of the primary synchronization signal.

7. The user equipment of claim 4, wherein the circuitry is further configured to decode repeatedly transmitted symbols based on a second subcarrier spacing of the PBCH.

8. The user equipment of claim 4, wherein the circuitry is further configured to demodulate the PBCH according to the reference symbol.

9. A base station for a mobile telecommunications system, the base station comprising:
  circuitry configured to:
    communicate with at least one user equipment; and
    transmit symbols, on a physical broadcast channel (PBCH), by applying a phase ramp, wherein
  each burst of the PBCH includes a reference symbol that is repeated in consecutive resource elements,
  a subcarrier spacing of the PBCH differs from a subcarrier spacing of a primary synchronization signal,
  the primary synchronization signal includes a synchronization sequence,
  a sign of one part of the synchronization sequence corresponds to the subcarrier spacing of the primary synchronization signal, and
  a sign of another part of the synchronization sequence corresponds to the subcarrier spacing of the PBCH.

10. The base station of claim 9, wherein the reference symbol is based on a Zadoff-Chu sequence.

11. The base station of claim 10, wherein a root of the Zadoff-Chu sequence differs from a root of a Zadoff-Chu sequence used for the primary synchronization signal.

12. The base station of claim 9, wherein the phase ramp is based on a phase shift applied to a previous symbol.

13. The base station of claim 9, wherein a phase shift of the phase ramp is spread over $2\pi$.

14. The user equipment of claim 9, wherein the reference symbol is for demodulation of the PBCH.

15. The base station of claim 9, wherein the symbols include quadrature amplitude modulation symbols.

* * * * *